United States Patent
Yamazaki (10) Patent No.: US 7,746,560 B2
(45) Date of Patent: Jun. 29, 2010

(54) ILLUMINATION OPTICAL SYSTEM THAT USES A SOLID-STATE LIGHTING ELEMENT WHICH GENERATES WHITE LIGHT, AND AN OPTICAL DEVICE EQUIPPED THEREWITH

(75) Inventor: Kentaro Yamazaki, Hamburg (DE)

(73) Assignee: Olympus Corporation, Tokyo (JP)

( * ) Notice: Subject to any disclaimer, the term of this patent is extended or adjusted under 35 U.S.C. 154(b) by 418 days.

(21) Appl. No.: 11/798,349

(22) Filed: May 14, 2007

(65) Prior Publication Data

US 2007/0268575 A1 Nov. 22, 2007

(30) Foreign Application Priority Data

May 17, 2006 (JP) ............................. 2006-137776

(51) Int. Cl.
*G02B 27/14* (2006.01)
*G02B 5/28* (2006.01)
*G03B 21/14* (2006.01)

(52) U.S. Cl. ........................... 359/634; 359/589; 353/84
(58) Field of Classification Search ................. 359/634, 359/589, 590, 722; 353/84
See application file for complete search history.

(56) References Cited

U.S. PATENT DOCUMENTS 6,674,575 B1 1/2004 Tandler et al.
7,597,447 B2 * 10/2009 Larson et al. .................. 353/84

FOREIGN PATENT DOCUMENTS

| JP | 2002-543453 | 12/2002 |
|---|---|---|
| JP | 2005-148296 | 6/2005 |
| WO | WO 00/65398 | 11/2000 |

* cited by examiner

*Primary Examiner*—Alicia M Harrington
(74) *Attorney, Agent, or Firm*—Arnold International; Bruce Y. Arnold (57) ABSTRACT

An illumination optical system for use in a microscope or electronic endoscope includes a solid-state lighting element that generates light having a spectral profile with peak intensities at multiple wavelengths such that the light output by said solid-state lighting element is perceived by an observer as being white in color, and a wavelength distribution conversion element having a spectral transmittance profile that includes specified wavelength regions within which the transmittance is nearly constant with increasing wavelength so as to form a step of nearly even intensity, and having specified wavelength regions within which the transmittance changes with increasing wavelength so as to form a transition region. By the combined effect of the solid-state lighting element and the wavelength distribution conversion element, the wavelength distribution of the light generated by the illumination optical system more closely resembles the wavelength distribution of daylight than the light generated by the solid-state lighting element.

7 Claims, 10 Drawing Sheets

ILLUMINATION OPTICAL SYSTEM THAT USES A SOLID-STATE LIGHTING ELEMENT WHICH GENERATES WHITE LIGHT, AND AN OPTICAL DEVICE EQUIPPED THEREWITH

The present application claims the benefit of foreign priority under 35 U.S.C. §119 of JP 2006-137776, filed May 17, 2006, the contents of which are hereby incorporated by reference.

BACKGROUND OF THE INVENTION

Figure 8:
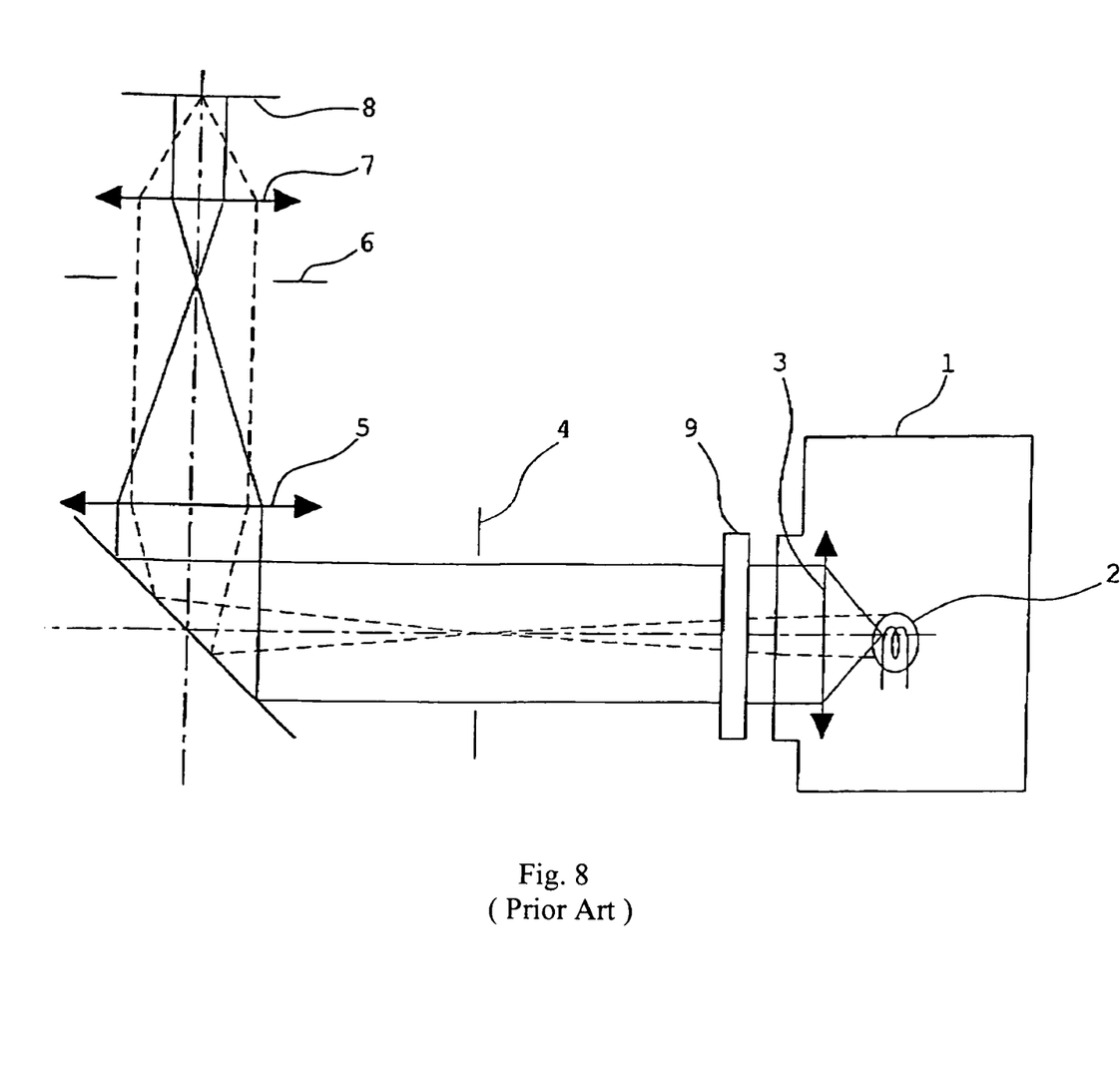
FIG. 8 shows a prior art illumination optical system used in an ordinary microscope.

Conventionally, an ordinary microscope (meaning one that does not provide stereo viewing optics so that a 3-D image is viewable) as shown in FIG. 8 may be formed of a lamp housing 1 having a light source 2 that generates illumination light; a collector lens 3 that converts light from the light source 2 into a substantially collimated light; a light-balanced daylight filter 9 that causes the spectral content of the light emitted by the light source to more closely resemble that of daylight; a diaphragm 4 that functions as a field stop to restrict the illumination light; a field lens 5 that converts the substantially collimated light emitted from the lamp housing 1 to a collected light flux; an aperture diaphragm 6; and a condenser lens 7 through which the illumination light from the field lens passes to a sample surface 8 that may be composed of an illuminated surface of an object.

In recent years, as a light source used for an illumination optical system, attention has been given to using solid-state lighting elements, such as LEDs and the like. An LED has the advantage of consuming less electrical power and having a longer life span than conventional halogen light sources. In particular, as a light source substitute for conventional halogen light sources, LEDs that emit light that is perceived as being white in color (hereinafter termed white light LEDs) have been developed. For example, Japanese Patent 2002-543453 and Japanese Laid Open Patent Application 2005-148296 each disclose an illumination optical system that uses a white light LED.

In biology/medical treatment applications where pathological specimens (i.e., thin slices) are examined using a microscope provided with an illumination optical system, a determination is made concerning disease based on the color of the observed cell specimen. During such examinations, if the spectral distribution of the illumination light source is changed, even when observing the same specimen using a microscope, the color of the observation object that may be observed either visually, or through a solid-state imaging element such as a CCD or the like, may result in erroneous diagnostic results. Owing to this, in an illumination light source used for diagnosis, it is important that there be a rather uniform distribution of spectral components in the illumination light. Thus, even when using a novel light source such as a white light LED, it is desirable to make the spectral components of the illumination light more closely resemble the spectral components in daylight by combining a white light LED light source with a wavelength distribution conversion element so as to thereby provide a distribution of spectral components that is similar to that output by a conventional halogen light source when combined with a light balanced daylight filter (for example, the spectral output shown by the dash line in FIG. 10).

A single lighting element of an LED typically provides light having a narrow spectral distribution centered about a single peak wavelength. Also, a white light LED may be composed of a single LED lighting element that provides a narrow spectral distribution centered about one peak wavelength and a fluorescent element that emits light having wavelengths centered about a longer peak wavelength. The fluorescent element is excited by the light emitted by the LED. White light is observed due to the eye being unable to resolve two separate point light sources located close together, and so the two light outputs are effectively mixed together and appear as a single white light source.

Figure 9:
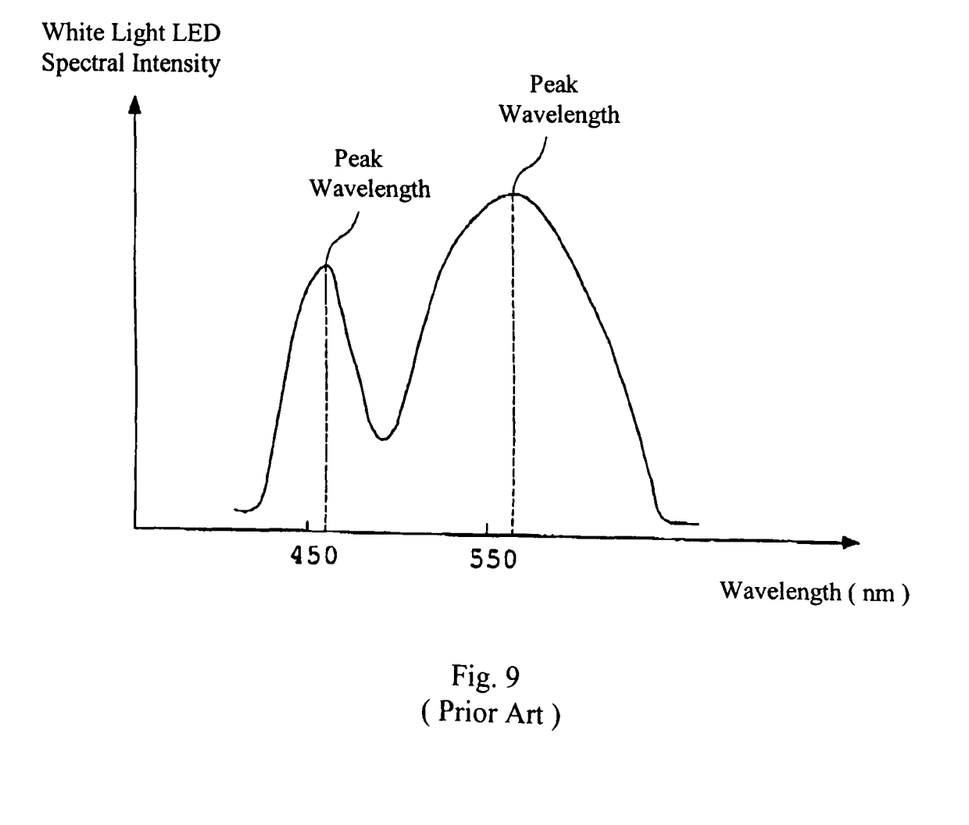
FIG. 9 shows the spectral intensity emitted by a white light LED.
Figure 10:
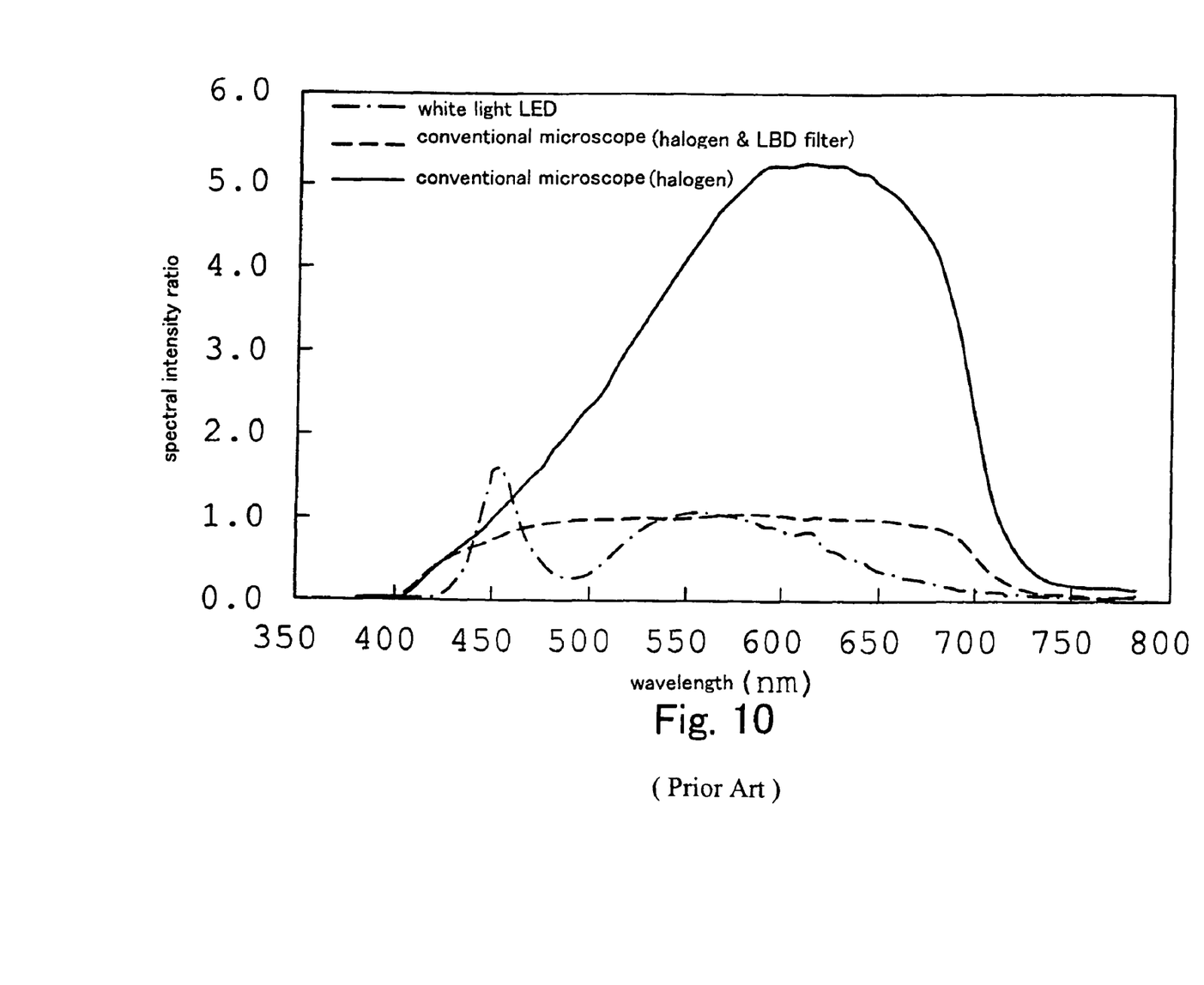
FIG. 10 shows the spectral intensity that is emitted by a white light LED (dot-dash line), a conventional halogen lamp (solid line), and the combination of a halogen lamp/light-balanced daylight filter (dash line).

However, in the case of a solid-state lighting element that uses a white light LED, one can see by comparing the curve of FIG. 9 with the solid curve of FIG. 10 that the spectral distribution emitted by such a white light LED (having one peak wavelength near 450 nm and another peak wavelength near 550 nm, as shown in FIG. 9) differs substantially from the spectral distribution of a halogen light source (shown by the solid line in FIG. 10) that is conventionally used as the illumination light source.

Owing to this, an illumination optical system that is equipped with a solid-state lighting element to generate white light (such as disclosed in JP 2002-543453 and in Japanese Laid Open Patent Application 2005-148296) cannot be used in its existent state for the diagnosis of pathological segmentations, and the like, using a microscope that is equipped with a halogen light source, since the diagnostic standards required when using illumination of an observation body with a microscope that employs a halogen light source are different than when using illumination of an observation body with a microscope that employs a solid-state lighting element. For example, if the illumination light source of a microscope were to be switched to a white light LED from a conventional light source, this would require that the microscopic diagnosis must be performed using a different diagnostic standard than previously used. Thus, an increased burden would be placed on individuals who perform diagnoses, owing to the concern about the possibility of an error in the diagnosis occurring due to an inapplicable diagnostic standard being applied for a given light source type.

In industrial applications as well, when mixing an examination performed using a microscope having a conventional halogen light source with an examination performed using a microscope having a white light LED (for example, in the case of using color to detect defect(s) of a magnetic head formed from multiple layers), there are inconveniences that are similar to those found in biological and medical applications.

BRIEF SUMMARY OF THE INVENTION

The present invention relates to an illumination optical system that uses solid-state lighting elements to generate white light and an optical device in which such an illumination optical system is used. For example, the present invention may be used in biological and medical applications, in general industrial applications, in endoscopes as well as in surgical microscopes that include stereo viewing optics so that a 3-D image may be viewed during surgery.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

In applications that accomplish diagnosis/detection of a specified observation object based on the color of the specified observation object, even if use is made of a white light LED as the illumination light source, the present invention enables the same diagnostic standards to be employed as when using a conventional halogen light source. This not only reduces the burden on the individual making the diagnosis/detection determination, it also reduces the incidence of incorrect diagnoses occurring due to a wrong diagnostic standard being applied.

In order to enable the same diagnostic standards to be employed as in the case of using a conventional halogen light source, the illumination optical system of the present invention uses a solid-state lighting element that generates white light in combination with a wavelength distribution conversion element having a spectral transmittance such that the spectral components of the light output by the combination more closely resembles the spectral components of daylight than the light output by the solid-state lighting element alone. As discussed above, the spectral content of the light output by the solid-state lighting element includes multiple peak wavelengths, and the spectral transmittance of the wavelength distribution conversion element has steps of different transmittance for different specified wavelength regions, with some of the specified wavelengths regions including a peak wavelength.

In addition, in the illumination optical system that uses a solid-state lighting element to generate white light according to the present invention, the wavelength distribution conversion element is desirably formed of a filter or filters. Either a dye filter, such as available from Fuji Film and termed a CC (color compensation) filter or an interference filter, such as available from Optical Coatings Japan, may be used. A selected filter is composed so that the transmittance in a specified wavelength region that includes a respective peak wavelength is low in comparison with the transmittance in a specified wavelength region that does not include a peak wavelength. Also, the wavelength distribution conversion element may be desirably formed of multiple filters, wherein each filter has a transmittance in a specified wavelength region that corresponds to a respective peak wavelength that is lower in comparison to the transmittance in other wavelength regions.

Moreover, the wavelength distribution conversion element preferably satisfies the following conditions:

$$480 \text{ nm} \leq \lambda 1 \leq 520 \text{ nm} \quad \text{Condition (1)}$$

$$580 \text{ nm} \leq \lambda 2 \leq 620 \text{ nm} \quad \text{Condition (2)}$$

where $\lambda 1$ is a wavelength at which the spectral transmittance profile of the wavelength distribution conversion element is changing with increasing wavelength from a first step of nearly even transmittance with increasing wavelength to a second step of nearly even transmittance with increasing wavelength; and $\lambda 2$ is a wavelength, longer than wavelength $\lambda 1$, at which the spectral transmittance profile of the wavelength distribution conversion element is changing with increasing wavelength from the second step to a third step of nearly even transmittance with increasing wavelength.

In addition, the transmittance of the wavelength distribution conversion element, within a specified wavelength region having wavelengths shorter than $\lambda 1$, is less than the transmittance of the wavelength distribution conversion element in a specified wavelength region having wavelengths longer than $\lambda 2$; and, the transmittance of the wavelength distribution conversion element, in a specified wavelength region having wavelengths longer than $\lambda 1$ and shorter than $\lambda 2$, may be less than the transmittance of the wavelength distribution conversion element in a specified wavelength region having wavelengths shorter than $\lambda 1$.

Alternatively, the wavelength distribution conversion element may have a transmittance, within a specified wavelength region having wavelengths longer than $\lambda 1$ and shorter than $\lambda 2$, that is higher than the transmittance of the wavelength distribution conversion element within a specified wavelength region having wavelengths shorter than $\lambda 1$; and the wavelength distribution conversion element may have a transmittance, within a specified wavelength region having wavelengths longer than $\lambda 1$ and shorter than $\lambda 2$, that is lower than the transmittance of the wavelength distribution conversion element within a specified wavelength region having wavelengths longer than $\lambda 2$.

As mentioned above, the wavelength distribution conversion element may be formed of multiple filters used in tandem, such as a first filter and a second filter. The first filter and the second filter may each be either a dye filter or an interference filter. More specifically, the first filter may have a spectral transmittance profile such that, within a specified wavelength region having wavelengths shorter than $\lambda 1$, the transmittance is nearly unchanging with increasing wavelength and, within a specified wavelength region having wavelengths longer than $\lambda 1$, the transmittance is nearly unchanging with increasing wavelength and in this latter region the transmittance is greater than the transmittance within the specified wavelength region having wavelengths shorter than $\lambda 1$. The second filter may have a spectral transmittance profile such that, within a specified wavelength region having wavelengths shorter than $\lambda 1$, the transmittance is nearly unchanging with increasing wavelength and, within a specified wavelength region having wavelengths longer than $\lambda 1$ but shorter than $\lambda 2$, the transmittance is nearly unchanging with increasing wavelength but the transmittance in this latter region is less than the transmittance within the specified wavelength region having wavelengths shorter than $\lambda 1$; and, within a specified wavelength region having wavelengths longer than $\lambda 2$, the transmittance is nearly unchanging with increasing wavelength, but the transmittance in this latter region is greater than the transmittance within the specified region having wavelengths longer than $\lambda 1$ and shorter than $\lambda 2$.

In addition, the optical device according to the present invention is characterized by being provided with an illumination optical system that uses a solid-state lighting element that generates white light according to the present invention.

According to the present invention, when diagnosing and detecting the state of an object observation body based on the color of the object observation body, even if use is made of a white light LED as the illumination light source, continued use can be made of diagnostic standards that are the same as when use is made of a conventional halogen light source. This not only lightens the burden of one performing a diagnosis, it also reduces errors attributable to using diagnostic standards that vary.

The illumination optical system of the present invention uses a wavelength distribution conversion element according to the present invention in lieu of using a light-balanced daylight filter 9 that is arranged in the light path of the prior art illumination optical system shown in FIG. 8 that uses a halogen light source. In addition, instead of the light source 2 being a halogen light source as in FIG. 8, a white light LED is substituted for the light source 2 so that the illumination optical system of the present invention uses a conventional, commercially-available white light LED in combination with a wavelength distribution conversion element. The latter element may be formed of a conventional, commercially available filter or two or more conventional, commercially-available filters used in tandem so as to achieve a spectral transmittance profile as specified herein.

The wavelength distribution conversion element 11 (FIG. 1) has a spectral transmittance profile that is designed to reduce the intensity of light from the white light LED light source more in specified wavelength regions that include a peak intensity emitted by the light source than in specified wavelength regions that do not include a peak intensity emitted by the light source. Thus, the transmittance of the wavelength distribution conversion element 11 for each specified wavelength region that includes a peak intensity wavelength output by the white light LED is less than in wavelength regions that do not include a peak intensity output by the white light LED. This has the effect of making the spectral components of the illumination optical system of the present invention (that uses a white light LED) more closely resemble the spectral components emitted by the combination of a halogen light source/light-balanced daylight filter. Also, this has the effect of making the light output by the illumination optical system according to the present invention more closely resemble the spectral components of daylight than the light output by a white light LED.

An explanation will now be provided concerning a practical example of a wavelength distribution conversion element 11.

As used in the light source 2, a spectral profile of the light output by a white light LED (as shown, for example, by the curve in FIG. 9 or the dot-dash line in FIG. 10), includes multiple peak wavelengths. The spectral content of the light from a halogen light source (as shown, for example, by the solid line in FIG. 10) greatly differs from that emitted by a white light LED. However, the spectral content of output light obtained when a conventional halogen light source and a conventional light-balanced daylight filter are combined (as shown, for example, by the dash line in FIG. 10) more nearly resembles the spectral content of daylight.

As a result of the spectral content of light emitted by a white light LED greatly differing from the light output by combining a halogen lamp with a light-balanced daylight filter, objects illuminated by light from a white light LED versus the combination will not appear to have the same color. In particular, the yellow components of the two illumination light sources differ greatly, causing a difference in color of the illuminated objects. Therefore, in the case wherein a white light LED is used as an illumination light source to diagnose a tissue sample, the judgment standards as to whether a particular tissue sample is healthy or diseased must be completely different than when a halogen lamp with a light-balanced daylight filter is used as the illumination light source.

In order to reproduce a color balance that is similar to the combination of a halogen light source/light-balanced daylight filter, it is necessary when using a white light LED in combination with a wavelength distribution conversion element to have the wavelength distribution conversion element transmit more red light than a conventional light-balanced daylight filter. In addition, as shown for example by the solid line in FIG. 9 or by the dot-dash line in FIG. 10, a white light LED emits light having a spectral profile with one peak transmittance centered about a wavelength of approximately 450 nm and another peak transmittance centered about a wavelength of approximately 550 nm. Therefore, in the present invention, use is made of a wavelength distribution conversion element 11 that reduces the intensity of light transmitted in the wavelength regions of 400~500 nm and 500~600 nm by different factors.

Several different examples of white light LED/wavelength distribution conversion element will now be described with reference to the drawings.

Example 1

Figure 1:
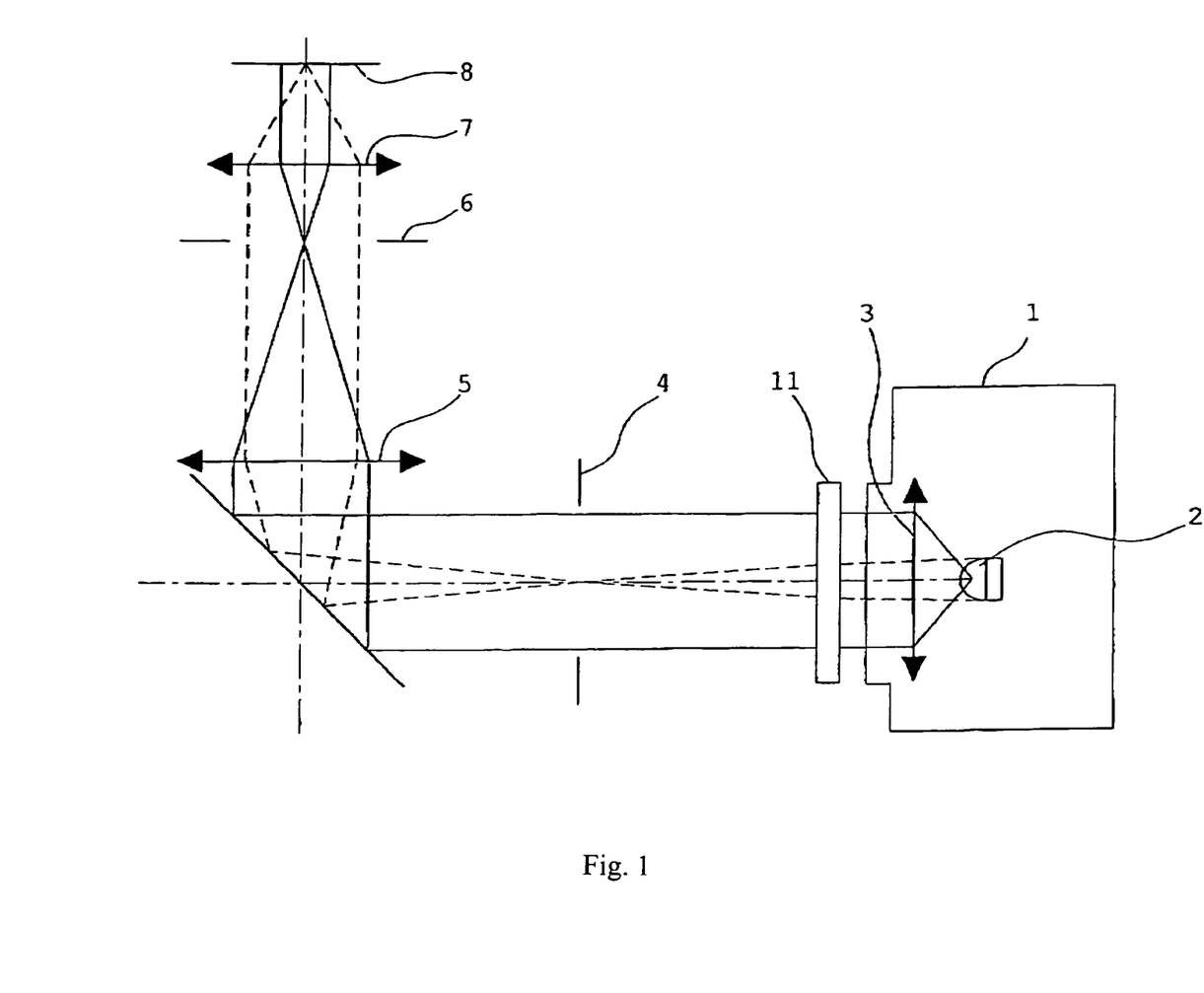
FIG. 1 shows an illumination optical system that uses a solid-state lighting element according to the present invention to generate white light.
Figure 2A:
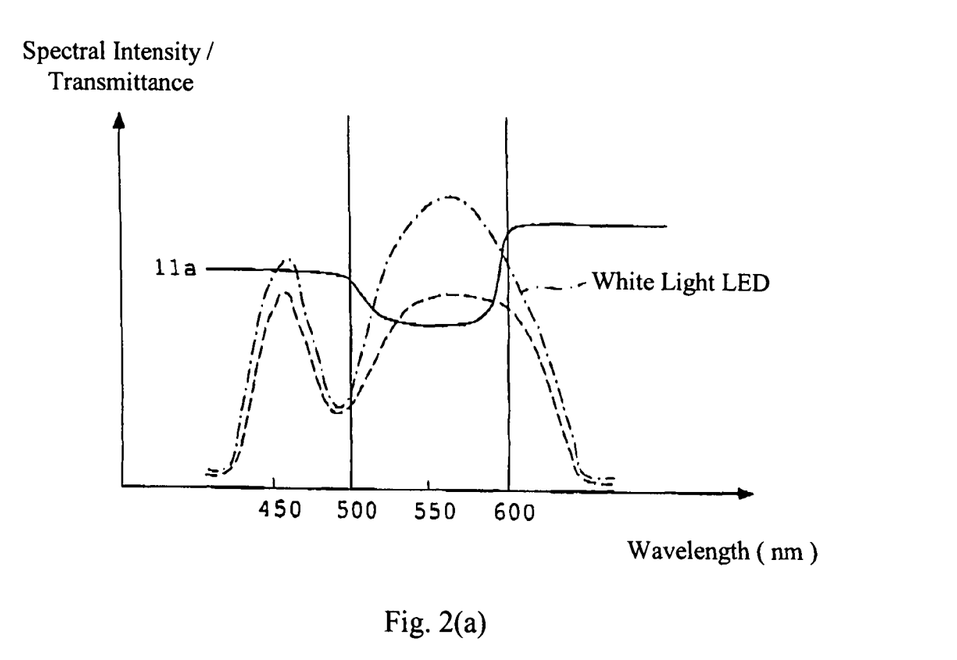
FIG. 2(a) shows the spectral intensity (i.e., light intensity as a function of wavelength) that is emitted by a first example of a white light LED (dot-dash line) that may be used in the illumination optical system shown in FIG. 1, the spectral transmittance of a first example of a wavelength distribution conversion element 11a (solid line) that may be used in the illumination optical system shown in FIG. 1, and the spectral intensity when the white light LED and the wavelength distribution conversion element 11a having the characteristics shown in FIG. 2(a) are used in combination (dash line) to form a first example of illumination optical system according to the present invention.

FIG. 2(a) shows the spectral intensity (i.e., light intensity as a function of wavelength) that is emitted by a first example of a white light LED (dot-dash line) that may be used in the illumination optical system shown in FIG. 1, the spectral transmittance of a first example of a wavelength distribution conversion element 11a (solid line) that may be used in the illumination optical system shown in FIG. 1, and the spectral intensity when the white light LED and the wavelength distribution conversion element 11a having the characteristics shown in FIG. 2(a) are used in combination (dash line) according to a first example of illumination optical system according to the present invention.

The wavelength distribution conversion element has a spectral transmittance profile that includes specified wavelength regions within which the transmittance is nearly constant with increasing wavelength so as to form a step of nearly even intensity, and has specified wavelength regions within which the transmittance changes with increasing wavelength so as to form a transition region. With the wavelength distribution conversion element relating to this example (having a spectral transmittance profile as shown by the solid line in FIG. 2(a)), the transmittance in each specified wavelength region that includes a peak wavelength is composed to be different and both transmittances are low in comparison with the transmittance in a specified wavelength region that does not include a peak wavelength, and the wavelength distribution conversion element is composed using a single optical element 11a.

As shown in FIG. 2(a), the transmittance of the wavelength distribution conversion element 11a, within a specified wavelength region having wavelengths shorter than approximately 500 nm, is less than the transmittance of the wavelength distribution conversion element in a specified wavelength region having wavelengths longer than approximately 600 nm; and the transmittance of the wavelength distribution conversion element, in a specified wavelength region having wavelengths longer than approximately 500 nm and shorter than approximately 600 nm, is less than the transmittance of the wavelength distribution conversion element in a specified wavelength region having wavelengths shorter than approximately 500 nm.

Example 2

Figure 2B:
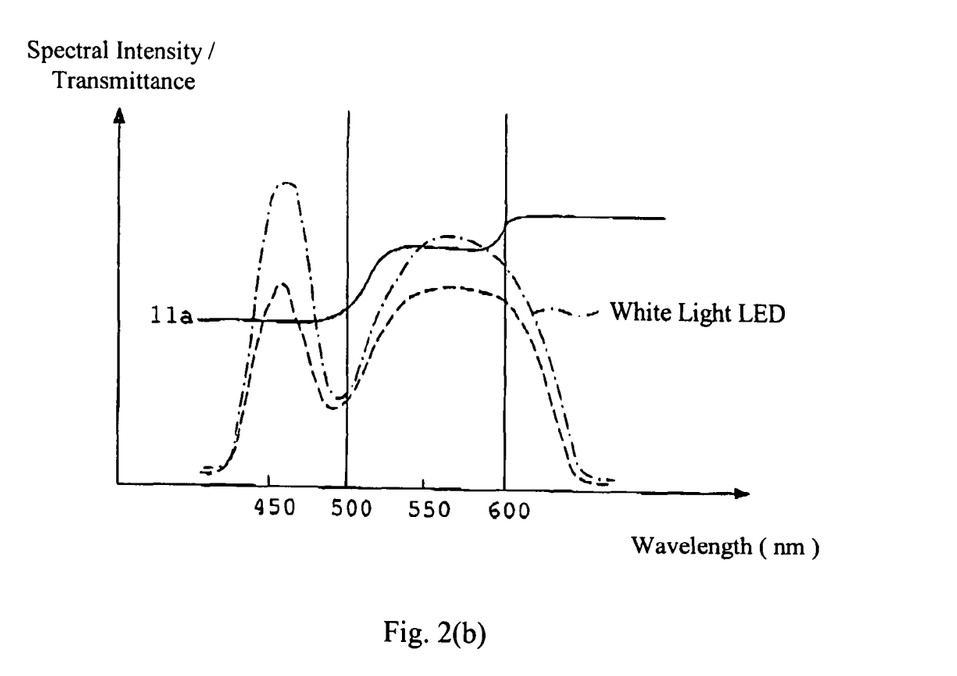
FIG. 2(b) shows the spectral intensity that is emitted by a second example of a white light LED (dot-dash line) that may be used in the illumination optical system shown in FIG. 1, the spectral transmittance of a second example of a wavelength distribution conversion element 11a (solid line) that may be used in the illumination optical system shown in FIG. 1, and the spectral intensity of light output when the white light LED and the wavelength distribution conversion element 11a having the characteristics shown in FIG. 2(b) are used in combination (dash line) to form a second example of illumination optical system according to the present invention.

FIG. 2(b) shows the spectral intensity that is emitted by a second example of a white light LED (dot-dash line) that may be used in the illumination optical system shown in FIG. 1, the spectral transmittance of a second example of a wavelength distribution conversion element 11a (solid line) that may be used in the illumination optical system shown in FIG. 1, and the spectral intensity of light output when the white light LED and the wavelength distribution conversion element 11a having the characteristics shown in FIG. 2(b) are used in combination (dash line) according to a second example of illumination optical system according to the present invention.

As shown in FIG. 2(b), the wavelength distribution conversion element 11a has a transmittance, within a specified wavelength region having wavelengths longer than approximately 500 nm and shorter than approximately 600 nm, that is higher than the transmittance of the wavelength distribution conversion element within a specified wavelength region having wavelengths shorter than approximately 500 nm; and the wavelength distribution conversion element 11a has a transmittance, within a specified wavelength region having wavelengths longer than approximately 500 nm and shorter than approximately 600 nm, that is lower than the transmittance of the wavelength distribution conversion element within a specified wavelength region having wavelengths longer than approximately 600 nm.

Example 3

Figure 3A:
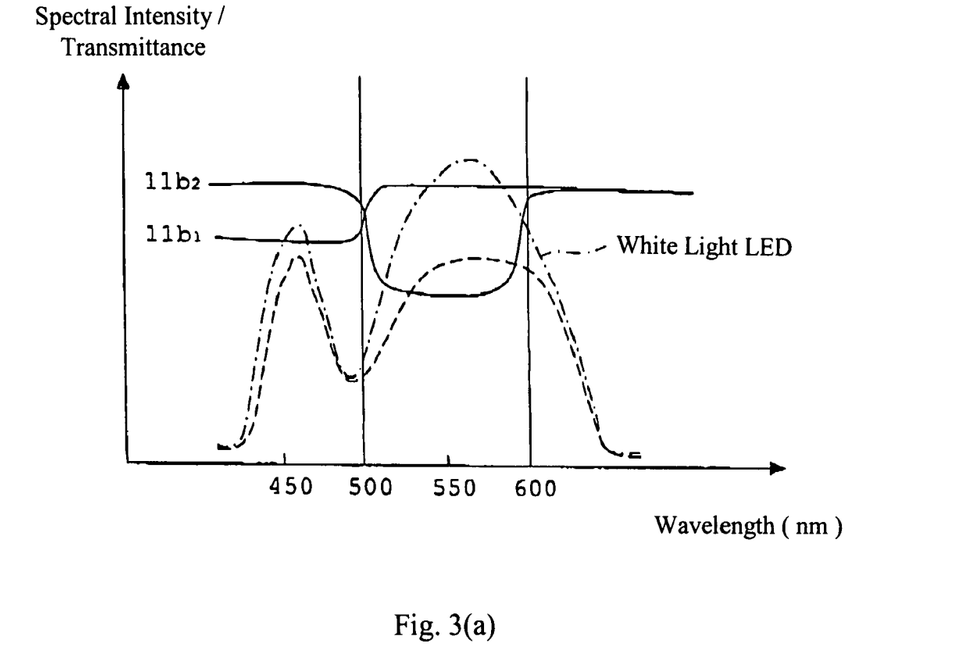
FIG. 3(a) shows the spectral intensity that is emitted by a third example of a white light LED (dot-dash line) that may be used in the illumination optical system shown in FIG. 1, the spectral transmittances of a first filter $11b_1$ and a second filter $11b_2$ that, in tandem, comprise a third example of a wavelength distribution conversion element that may be used in the illumination optical system shown in FIG. 1, and the spectral intensity of light output when the white light LED and the wavelength distribution conversion element having the characteristics shown in FIG. 3(a) are used in combination (dash line) to form a third example of illumination optical system according to the present invention.

FIG. 3(a) shows the spectral intensity that is emitted by a third example of a white light LED (dot-dash line) that may be used in the illumination optical system shown in FIG. 1, the spectral transmittances of a first filter $11b_1$ and a second filter $11b_2$ that, in tandem, comprise a third example of a wavelength distribution conversion element in the illumination optical system shown in FIG. 1, and the spectral intensity of light output when the white light LED and the wavelength distribution conversion element having the characteristics shown in FIG. 3(a) are used in combination (dash line) according to a third example of illumination optical system according to the present invention. In this example as well as the next example, the wavelength distribution conversion element is formed of multiple filters that are positioned in tandem, one for each peak intensity emitted by the white light LED. As shown in FIG. 3(a) for this example, the wavelength distribution conversion element is formed of:

the first filter having a spectral transmittance profile that, within a specified wavelength region having wavelengths shorter than approximately 500 nm, has a transmittance that is nearly unchanging with increasing wavelength, and within a specified wavelength region having wavelengths longer than approximately 500 nm, has a transmittance that is nearly unchanging with increasing wavelength, but the transmittance is greater than the transmittance within the specified wavelength region having wavelengths shorter than approximately 500 nm; and the second filter having a spectral transmittance profile that, within a specified wavelength region having wavelengths shorter than approximately 500 nm, has a transmittance that is nearly unchanging with increasing wavelength, and within a specified wavelength region having wavelengths longer than approximately 500 nm but shorter than approximately 600 nm, has a transmittance that is nearly unchanging with increasing wavelength but the transmittance is less than the transmittance within the specified wavelength region having wavelengths shorter than approximately 500 nm; and within a specified wavelength region having wavelengths longer than approximately 600 nm, has a transmittance that is nearly unchanging with increasing wavelength, but the transmittance is greater than the transmittance within the specified region having wavelengths longer than approximately 500 nm and shorter than approximately 600 nm.

Example 4

Figure 3B:
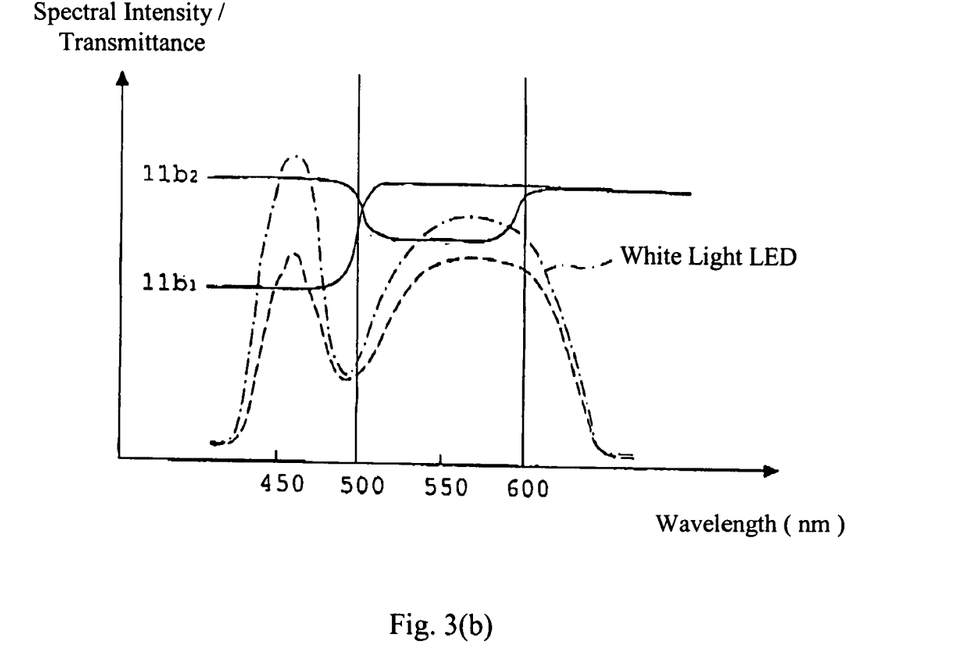
FIG. 3(b) shows the spectral intensity that is emitted by a fourth example of a white light LED (dot-dash line) that may be used in the illumination optical system shown in FIG. 1, the spectral transmittances of a first filter $11b_1$ and a second filter $11b_2$ that, in tandem, comprise a fourth example of a wavelength distribution conversion element that may be used in the illumination optical system shown in FIG. 1, and the spectral intensity of light output when the white light LED and the wavelength distribution conversion element having the characteristics shown in FIG. 3(b) are used in combination (dash line) to form a fourth example of illumination optical system according to the present invention.

FIG. 3(b) shows the spectral intensity that is emitted by a fourth example of a white light LED (dot-dash line) that may be used in the illumination optical system shown in FIG. 1, the individual spectral transmittances of a first filter $11b_2$ and a second filter $11b_2$ that, in tandem, comprise a fourth example of a wavelength distribution conversion element in the illumination optical system shown in FIG. 1, and the spectral intensity of light output when the white light LED and the wavelength distribution conversion element (formed of two filters in tandem, the individual transmission characteristics of which are shown in FIG. 3(b)) are used in combination (dash line) according to a fourth example of illumination optical system according to the present invention.

The spectral transmittances of the first filter $11b_1$ and the second filter $11b_2$ are such that: the spectral transmittance of the two filters in tandem in a specified wavelength region that is shorter than approximately 500 nm is less than the transmittance of the two filters in tandem in a specified wavelength region that is longer than approximately 500 nm; the transmittance of the two filters in tandem in a specified wavelength region that is longer than approximately 500 nm and shorter than approximately 600 nm is greater than the transmittance of the two filters in tandem in a specified wavelength region that is shorter than approximately 500 nm; and, the transmittance of the two filters in tandem in a specified wavelength region that is longer than approximately 600 nm is greater than the transmittance of the two filters in tandem in the specified wavelength region that is longer than approximately 500 nm and shorter than approximately 600 nm. Thus, the two filters $11b1$ and $11b2$ shown in FIG. 3(b), when arranged in tandem, comprise the wavelength distribution conversion element of this embodiment that has a spectral transmittance profile similar in shape to that of the wavelength distribution conversion element $11a$ of the second example shown in FIG. 2(b).

In the illumination optical systems according to the above examples, if light emitted by a white light LED transmits through the wavelength distribution conversion element, the spectral intensities at the peak wavelengths are reduced (as shown by dash lines in FIGS. 2(a)-3(b)) and the light output by the illumination optical system more closely resembles the light output by a halogen light source and a light-balanced daylight filter as shown by the dash line in FIG. 10. Moreover, there are differences in the intensity maximums of each peak intensity emitted by a white light LED. Having the wavelength distribution conversion element be formed of multiple filters in tandem has the advantage of allowing the individual filters to be selected to appropriately reduce the intensity of a respective peak intensity.

Moreover, in this example, a white light LED appropriately uses a wavelength distribution conversion element to reduce the intensity maximums of two peak intensities. However, it is possible for a white light LED to emit light having more than two peak intensities. In other words, by combining multiple fluorescent substances, a white light LED can emit multiple peak intensities (i.e., greater than 2 peak intensities). In such a case, the wavelength distribution conversion element would desirably reduce the peak intensity maximum at each of the multiple peak intensities.

Example 5

Figure 4:
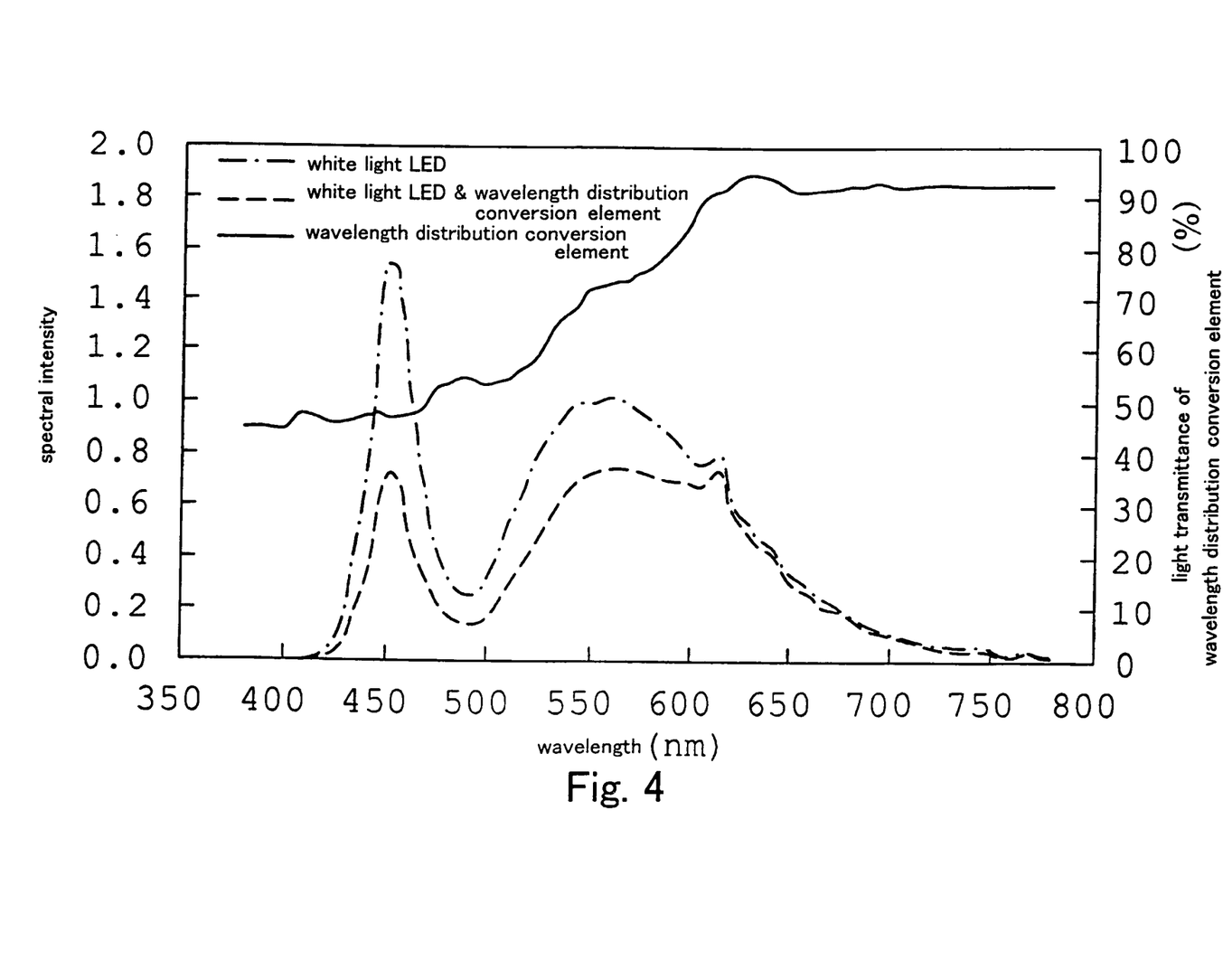
FIG. 4 shows the spectral intensity that is emitted by a fifth example of a white light LED (dot-dash line), the spectral transmittance of a wavelength distribution conversion element (solid line) according to a fifth example of a wavelength distribution conversion element, and the spectral intensity of light output when the white light LED and the wavelength distribution conversion element having the characteristics shown in FIG. 4 are used in combination (dash line) to form a fifth example of illumination optical system according to the present invention.
Figure 5:
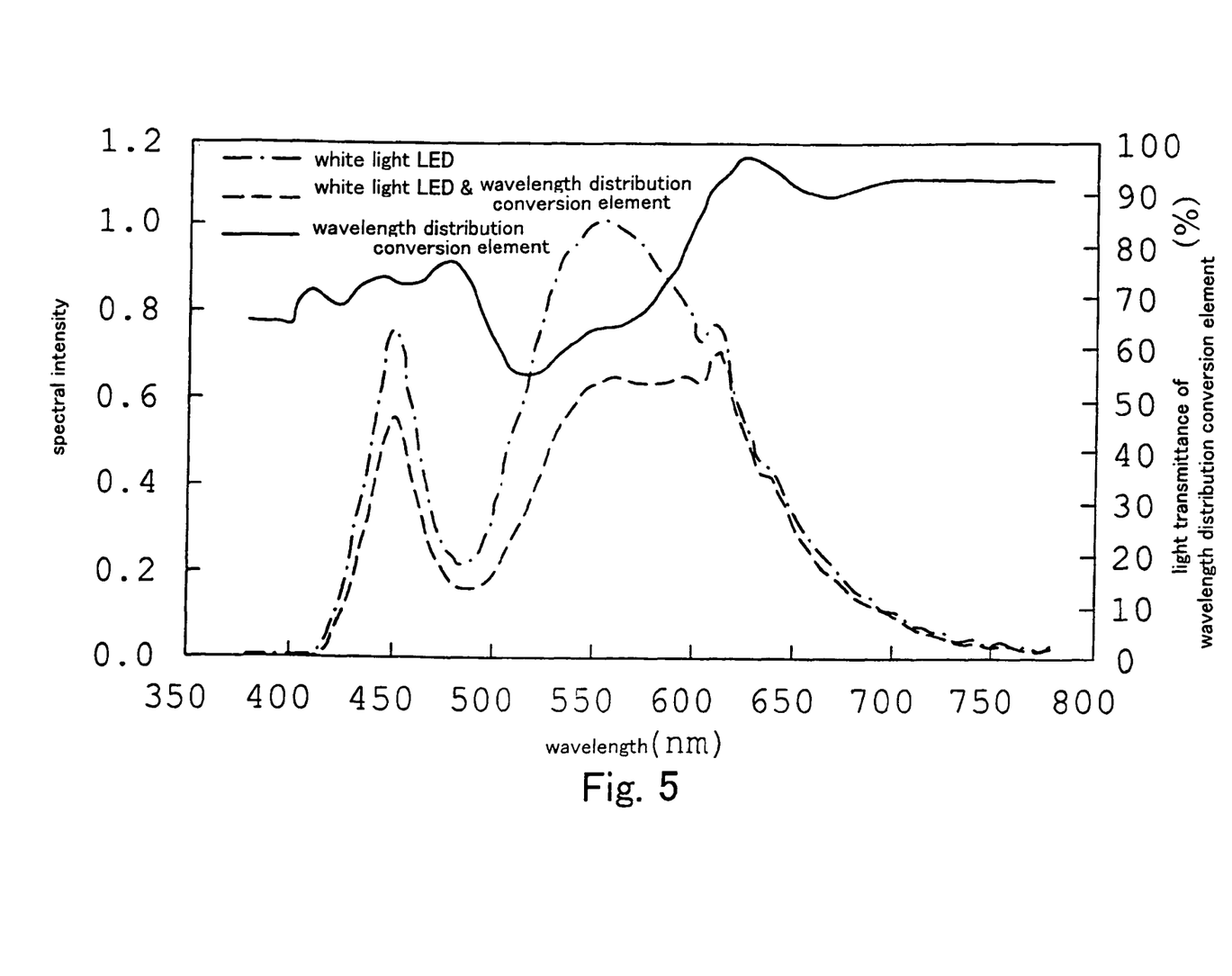
FIG. 5 shows the spectral intensity that is emitted by a sixth example of a white light LED (dot-dash line), the spectral transmittance of a wavelength distribution conversion element (solid line) according to a sixth example of a wavelength distribution conversion element, and the spectral intensity of light output when the white light LED and the wavelength distribution conversion element having the characteristics shown in FIG. 5 are used in combination (dash line) to form a sixth example of illumination optical system according to the present invention.

FIG. 4 shows the spectral intensity that is emitted by a fifth example of a white light LED (dot-dash line), the spectral transmittance of a wavelength distribution conversion element (solid line) according to a fifth example of a wavelength distribution conversion element, and the spectral intensity of light output when the white light LED and the wavelength distribution conversion element having the characteristics shown in FIG. 4 are used in combination (dash line). This example is similar in construction to Example 2. White light LED's have a spectral output that generally can be categorized into two types, as will now be discussed. Both types generally have two peak intensities, with one peak intensity being centered at about 450 nm, and another peak intensity being centered at a longer wavelength. In the first type of white light LED, of which the LED spectral intensity shown in FIG. 4 is exemplary, the peak intensity that is centered at about 450 nm is higher in intensity than the peak intensity centered at a longer wavelength. In the second type of white light LED, of which the LED spectral intensity shown in FIG. 5 is exemplary, the peak intensity that is centered at about 450 nm is lower in intensity than the peak intensity centered at a longer wavelength. Moreover, the composition of the basic optical members of the illumination optical system relating to Example 5 is substantially the same as the composition shown in FIG. 1.

In addition, the CIE color coordinates (X,Y) for test color samples R1 to R9 (as defined in CIE Technical Report 13-3-1995 (ISBN: 3 900 734 57 7)) entitled "Method of Measuring and Specifying Colour Rendering Properties of Light Sources" are shown in Table 1 below for each of three illumination optical systems that are listed in separate columns A-C, as follows: Column A—an illumination optical system that combines a conventional halogen light source with a conventional light-balanced daylight filter; Column B—an illumination optical system that uses a white light LED according to the fifth example; and Column C—an illumination optical system that uses a combination of the white light LED/wavelength distribution conversion element according to the fifth example of illumination optical system according to the present invention.

TABLE 1

| Test Sample | A | | B | | C | |
|---|---|---|---|---|---|---|
| | X | Y | X | Y | X | Y |
| R1 | 0.425 | 0.376 | 0.394 | 0.366 | 0.444 | 0.392 |
| R2 | 0.423 | 0.428 | 0.401 | 0.428 | 0.443 | 0.442 |
| R3 | 0.402 | 0.487 | 0.388 | 0.495 | 0.420 | 0.500 |
| R4 | 0.319 | 0.448 | 0.317 | 0.438 | 0.356 | 0.464 |
| R5 | 0.295 | 0.370 | 0.286 | 0.343 | 0.329 | 0.385 |

TABLE 1-continued

| Test | A | | B | | C | |
|---|---|---|---|---|---|---|
| Sample | X | Y | X | Y | X | Y |
| R6 | 0.280 | 0.310 | 0.264 | 0.273 | 0.310 | 0.320 |
| R7 | 0.336 | 0.305 | 0.304 | 0.274 | 0.359 | 0.319 |
| R8 | 0.382 | 0.320 | 0.342 | 0.296 | 0.400 | 0.335 |
| R9 | 0.603 | 0.324 | 0.556 | 0.328 | 0.596 | 0.337 |

Example 6

FIG. 5 shows the spectral intensity that is emitted by a sixth example of a white light LED (dot-dash line), the spectral transmittance of a wavelength distribution conversion element (solid line) according to a sixth example of a wavelength distribution conversion element, and the spectral intensity of light output when the white light LED and the wavelength distribution conversion element having the characteristics shown in FIG. 5 are used in combination (dash line). As noted above, the spectral output of the white light LED of this example is of the second type. This example is similar in construction to Example 1. Moreover, the composition of the basic optical members of the illumination optical system relating to Example 6 is substantially the same as the composition shown in FIG. 1.

In addition, the CIE color coordinates (X,Y) for test color samples R1 to R9 (as defined in CIE Technical Report 13-3-1995 (ISBN: 3 900 734 57 7)) entitled "Method of Measuring and Specifying Colour Rendering Properties of Light Sources" are shown in Table 2 below for each of three illumination optical systems that are listed in separate columns A-C, as follows: Column A—an illumination optical system that combines a conventional halogen light source with a conventional light-balanced daylight filter; Column B—an illumination optical system that uses a white light LED according to a sixth example of white light LED; and Column C—an illumination optical system that uses a combination of the white light LED with a wavelength distribution conversion element to form a sixth example of illumination optical system according to the present invention.

TABLE 2

| Test | A | | B | | C | |
|---|---|---|---|---|---|---|
| Sample | X | Y | X | Y | X | Y |
| R1 | 0.425 | 0.376 | 0.427 | 0.410 | 0.452 | 0.390 |
| R2 | 0.423 | 0.428 | 0.424 | 0.463 | 0.450 | 0.439 |
| R3 | 0.402 | 0.487 | 0.401 | 0.520 | 0.426 | 0.496 |
| R4 | 0.319 | 0.448 | 0.340 | 0.490 | 0.361 | 0.464 |
| R5 | 0.295 | 0.370 | 0.318 | 0.411 | 0.335 | 0.387 |
| R6 | 0.280 | 0.310 | 0.299 | 0.345 | 0.316 | 0.323 |
| R7 | 0.336 | 0.305 | 0.346 | 0.338 | 0.367 | 0.320 |
| R8 | 0.382 | 0.320 | 0.384 | 0.353 | 0.410 | 0.335 |
| R9 | 0.603 | 0.324 | 0.580 | 0.346 | 0.603 | 0.335 |

Figure 6:
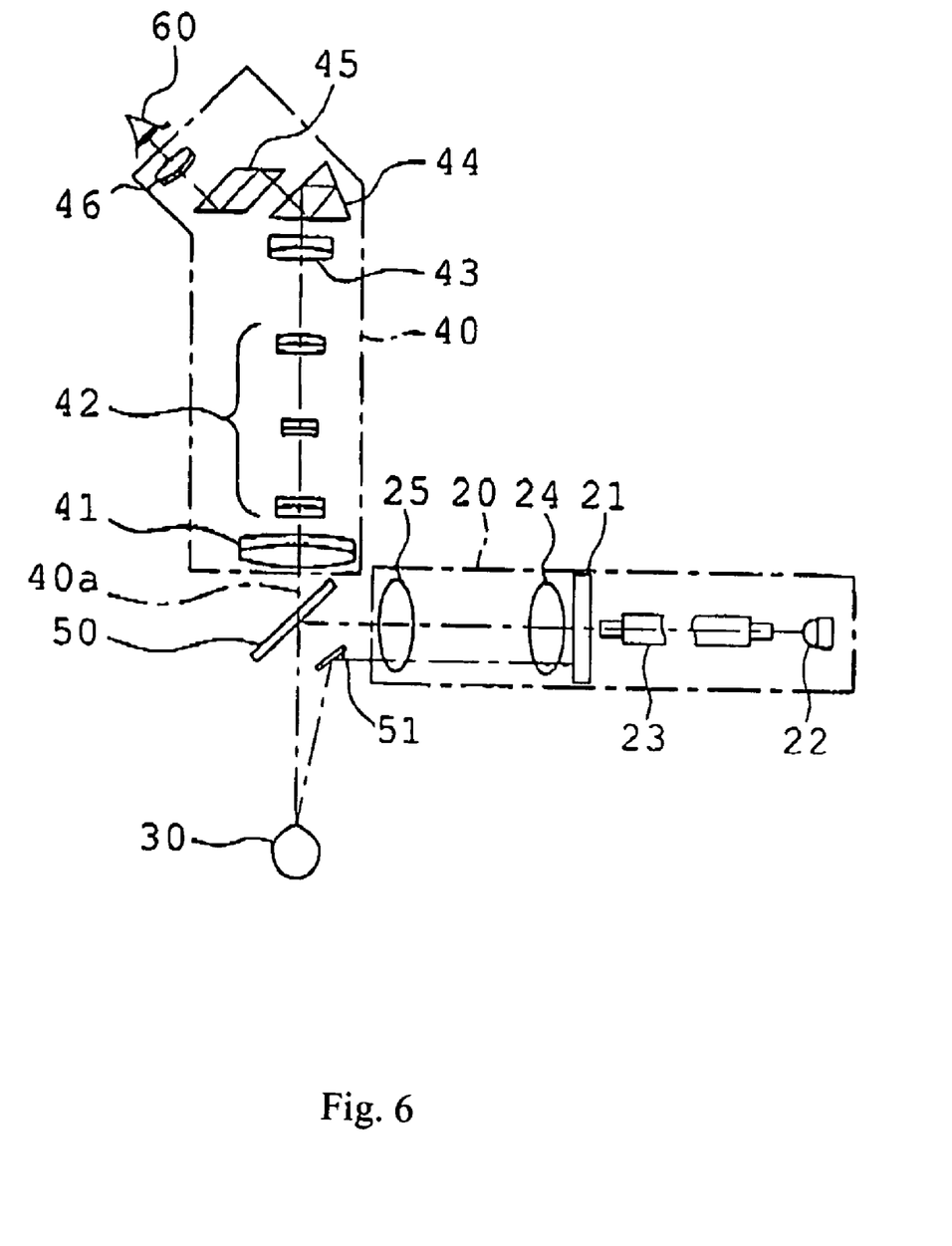
FIG. 6 shows a microscope, which may have stereo imaging capability so that it may be used to provide 3-D images that are useful in performing surgical operations, with the microscope using the illumination optical system according to any of the first through sixth examples of the illumination optical system according to the present invention.

FIG. 6 shows a microscope that may be used in performing surgical operations, with the microscope using the illumination optical system according to any of the disclosed examples of the present invention. The microscope used for surgery is provided with an illumination optical system 40 for has a light source 22, an observation optical system 40 for observing a living subject's eyeball 30, a half mirror 50 arranged between the eyeball 30 and the observation optical system 40, and an entire reflection mirror 51.

The half mirror 50 reflects the illumination light flux generated by the light source 22 towards the eyeball 30 (i.e., along the optical axis 40a of the observation optical system 40), and the light flux reflected by the eyeball 30 is led to the observation optical system 40 along the optical axis 40a. By means of the half mirror 50, sufficient illumination of the eyeball 30 is provided so as to enable minute images to be obtained of the bottom inner surface of the eyeball using the light flux (red in color) reflected by the bottom inner surface of the eyeball 30.

The entire reflection mirror 51 that is positioned between the eyeball 30 and the observation optical system 40, more specifically, below the half mirror 50 that is arranged below the first object lens 41, is arranged in a position that does not obstruct the optical flux reflected from the subject's eyeball 30 (in other words, at a position in which none of the entire reflection mirror 51 is within the field of vision when a surgeon's eye 60 observes the eyeball 30).

The observation optical system 40 is composed of: a first object lens 41 formed to be substantially the same size as the half mirror 50; a variable power optical system 42 capable of selectively setting the optical power; a second object lens 43; an upright prism 44; a rhombus prism 45; and an eyepiece lens 46. In the observation optical system 40, each optical element except the first object lens 41 moves laterally as a unit so that the eye surgery can be accomplished using three dimensional viewing. Thus, FIG. 6 illustrates the components on only one side of the microscope that direct light to one of the observer's eyes. The illumination optical system 20, in addition to being composed of a light source 22, also includes an optical fiber 23, a condenser lens 24 and a relay lens 25.

Microscopes used in surgical operations have a composition such that the illumination light flux that sends light from the light source 22 is led to the half mirror 50 through the optical fiber 23, the condenser lens 24 and the relay lens 25. The half mirror 50 reflects the illumination light flux, thereby illuminating the subject's eyeball 30 along the optical axis 40a of the observation optical system 40. On the other hand, the entire reflection mirror 51 reflects part of the illumination light flux received from the relay lens 25, and thus illuminates the subject's eyeball 30 from a slightly different direction. Because the direction of illumination light reflected toward the subject's eyeball 30 by the entire reflection mirror 51 is slightly different from the illumination direction of light reflected toward the subject's eyeball 30 by the half mirror 50, it becomes possible to form an image during cataract surgery, for example, of a crystal organization of a liquid crystal substance. In addition, since the entire reflection mirror 51 is arranged in close proximity to the half mirror 50, the direction of illumination of the half mirror 50 and the direction of illumination of the entire reflection mirror 51 form an acute angle, thereby enabling a sharp image to be formed, without there being dull shadows, using light from the white light LED.

The light flux reflected by the subject's eyeball 30 transmits through the half mirror 50 and is led to the observation optical system 40. This light flux then passes through the observation optical system 40 so as to reach the surgeon's eyeball 60. However, the image of the subject's eyeball formed using this light flux is a magnified image having a specific power that has been formed by means of the variable power optical system. The magnified image transmits through the second object lens 43, the upright prism 44, and the rhombus prism 45, and observation is accomplished by being incident onto the surgeon's eyeball 60 through the eyepiece 46.

Furthermore, in a microscope used in surgery provided with such a composition, the combination of a white light LED/wavelength distribution conversion element according to one of Examples 1-6 of the present invention may be arranged at a specified position on the light emission path of the light source 22 in the illumination optical system 20.

Figure 7:
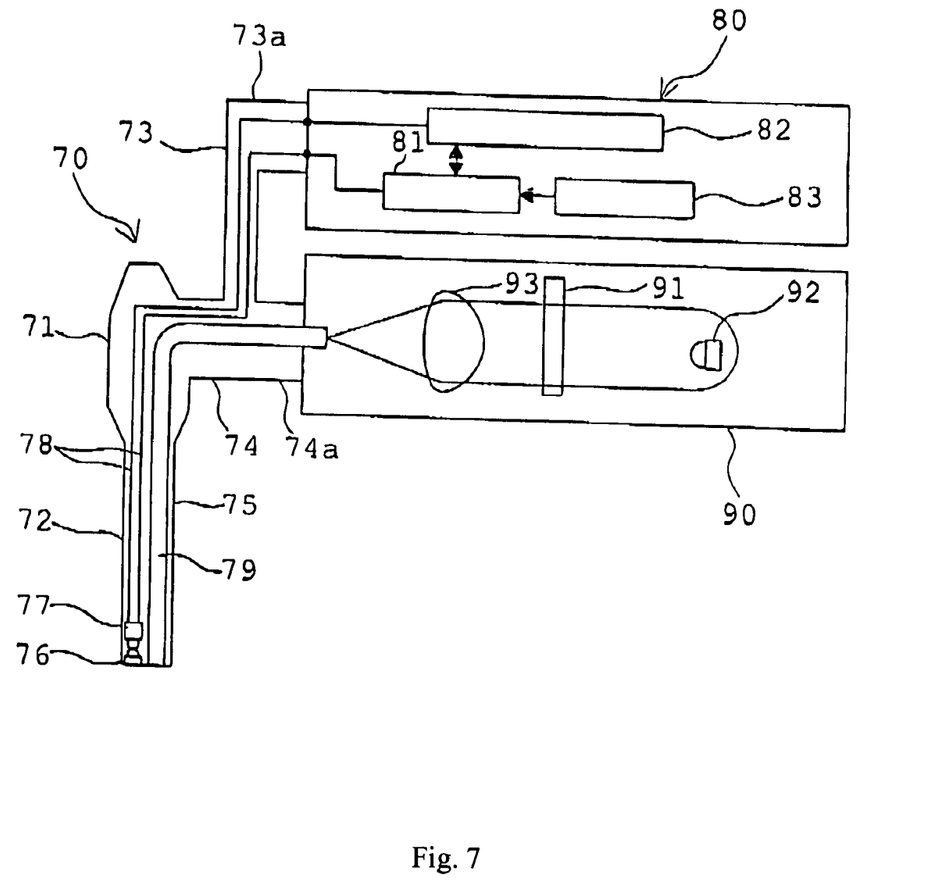
FIG. 7 shows an electronic endoscope that uses an illumination optical system according to any of the first through sixth examples of the illumination optical system according to the present invention.

FIG. 7 shows an electronic endoscope that also uses an illumination optical system according to the present invention. As shown in FIG. 7, an electronic endoscope 70 is composed of an operating unit 71, an insertion component 72, and a main body 75. To cables 73 and 74 are attached connectors 73a and 74a that are respectively connected to an image processor 80 and a light source 90. A CCD 77 is attached to the tip end of the insertion component 72 so as to capture images that are formed by the objective optical system 76 onto the light receiving surface of the CCD. The CCD 77 is electrically connected to the image processor 80 via the connector 73a and signal lines 78, 78 that are arranged within the main body 75. In addition, the electronic endoscope 70 is attached by a light guide 79 that is formed of a glass fiber and through which illumination light is transmitted to the tip of the insertion component 72. The light guide 79 is connected to the light source 90 through the connector 74a. The light source 90 is formed of a lamp 92 and a lens 93 for collecting the illumination light on the incident surface of the light guide 79.

When using an electronic endoscope having an illumination optical system according to the present invention, the illumination optical system is provided with the lamp 92 of the light source 90, the lens 93, and the light guide 79 of the electronic endoscope 70. To the image processor 80 is attached a drive circuit 81 which drives the CCD 77 of electronic endoscope 70, a video image processing circuit 82 which processes a signal imaged by the CCD 77, and a control circuit 83 which controls driving of the drive circuit 81.

In an electronic endoscope device thus composed, for the lamp 92 of the light source 90, the combination of a white light LED/wavelength distribution conversion element that has a spectral output according to the illumination optical system of the present invention may be used. The wavelength distribution conversion element 91, which is designed for use with a white light LED, is arranged in a specified position, namely, between the lamp 92 and the lens 93 as shown in FIG. 7.

The present invention enables an illumination optical system to employ a white light LED as an illumination light source while also enabling the state of an observation object to be reliably and accurately determined based on the color of the observation object. Therefore, the present invention is especially useful in performing medical diagnoses.

The invention being thus described, it will be obvious that the same may be varied in many ways. For example, a white light LED/wavelength distribution conversion element combination other than those disclosed above as being exemplary of the invention may be used. If using a white light LED having a spectral output of the first type (in which the light output having a peak intensity at about 450 nm is more intense than the peak intensity at a longer wavelength), a filter is selected having a spectral transmittance similar in shape to that of the solid line shown in FIG. 2(b), or filters are selected having spectral transmittances similar in shape to that of the solid lines shown in FIG. 3(b). On the other hand, if using a white light LED having a spectral output of the second type (in which the light output having a peak intensity at about 450 nm is less intense than the peak intensity at a longer wavelength), a filter is selected having a spectral transmittance similar in shape to that of the solid line shown in FIG. 2(a), or filters are selected having spectral transmittances similar in shape to that of the solid lines shown in FIG. 3(a). Also, white light LEDs that emit more than two peak wavelengths may be used. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An illumination optical system comprising:
   a solid-state lighting element that generates light having a spectral profile with peak intensities at multiple wavelengths such that the light output by said solid-state lighting element is perceived by an observer as being white in color; and
   a wavelength distribution conversion element having a spectral transmittance profile that includes specified wavelength regions within which the transmittance is nearly constant with increasing wavelength so as to form a step of nearly even intensity, and having specified wavelength regions within which the transmittance changes with increasing wavelength so as to form a transition region;
   wherein,
   by the combined effect of said solid-state lighting element and said wavelength distribution conversion element, the wavelength distribution of the light generated by the illumination optical system more closely resembles the wavelength distribution of daylight than the light generated by the solid-state lighting element; and
   the number of specified wavelength regions where the wavelength distribution conversion element has a transmittance that is lower than the transmittance in said specified wavelength regions that include a peak intensity equals the number of peak intensities generated by the solid-state lighting element.

2. An illumination optical system comprising:
   a solid-state lighting element that generates light having a spectral profile with peak intensities at multiple wavelengths such that the light output by said solid-state lighting element is perceived by an observer as being white in color; and
   a wavelength distribution conversion element having a spectral transmittance profile that includes specified wavelength regions within which the transmittance is nearly constant with increasing wavelength so as to form a step of nearly even intensity, and having specified wavelength regions within which the transmittance changes with increasing wavelength so as to form a transition region;
   wherein,
   by the combined effect of said solid-state lighting element and said wavelength distribution conversion element, the wavelength distribution of the light generated by the illumination optical system more closely resembles the wavelength distribution of daylight than the light generated by the solid-state lighting element;
   said wavelength distribution conversion element satisfies the following conditions:
   480 nm$\leqq \lambda 1 \leqq$520 nm
   580 nm$\leqq \lambda 2 \leqq$620 nm
   where
   $\lambda 1$ is a wavelength at which the spectral transmittance profile of said wavelength distribution conversion element is changing with increasing wavelength from a first step of nearly even transmittance with increasing wavelength to a second step of nearly even transmittance with increasing wavelength; and λ2 is a wavelength, longer than wavelength λ1, at which the spectral transmittance profile of said wavelength distribution conversion element is changing with increasing wavelength from said second step to a third step of nearly even transmittance with increasing wavelength;

said wavelength distribution conversion element being formed of:
- a first filter having a spectral transmittance profile that,
  - within a specified wavelength region having wavelengths shorter than λ1, has a transmittance that is nearly unchanging with increasing wavelength, and
  - within a specified wavelength region having wavelengths longer than λ1, has a transmittance that is nearly unchanging with increasing wavelength but the transmittance is greater than the transmittance within the specified wavelength region having wavelengths shorter than λ1;
- a second filter having a spectral transmittance profile that,
  - within a specified wavelength region having wavelengths shorter than λ1, has a transmittance that is nearly unchanging with increasing wavelength,
  - within a specified wavelength region having wavelengths longer than λ1 but shorter than λ2, has a transmittance that is nearly unchanging with increasing wavelength but the transmittance is less than the transmittance within the specified wavelength region having wavelengths shorter than λ1, and
  - within a specified wavelength region having wavelengths longer than λ2, has a transmittance that is nearly unchanging with increasing wavelength, but the transmittance is greater than the transmittance within the specified region having wavelengths longer than λ1 and shorter than λ2.

3. A microscope that has an illumination optical system as set forth in claim 2.

4. An apparatus as set forth in claim 3, wherein said microscope is provided with stereo viewing optics so that a 3-D image may be viewed.

5. An electronic endoscope that has an illumination optical system as set forth in claim 2.

6. An illumination optical system comprising:
a solid-state lighting element that generates light having a spectral profile with peak intensities at multiple wavelengths such that the light output by said solid-state lighting element is perceived by an observer as being white in color; and
a wavelength distribution conversion element having a spectral transmittance profile that includes specified wavelength regions within which the transmittance is nearly constant with increasing wavelength so as to form a step of nearly even intensity, and having specified wavelength regions within which the transmittance changes with increasing wavelength so as to form a transition region;
wherein
by the combined effect of said solid-state lighting element and said wavelength distribution conversion element, the wavelength distribution of the light generated by the illumination optical system more closely resembles the wavelength distribution of daylight than the light generated by the solid-state lighting element;

said wavelength distribution conversion element satisfies the following conditions:
480 nm≦λ1≦520 nm
580 nm≦λ2≦620 nm
where
λ1 is a wavelength at which the spectral transmittance profile of said wavelength distribution conversion element is changing with increasing wavelength from a first step of nearly even transmittance with increasing wavelength to a second step of nearly even transmittance with increasing wavelength; and
λ2 is a wavelength, longer than wavelength λ1, at which the spectral transmittance profile of said wavelength distribution conversion element is changing with increasing wavelength from said second step to a third step of nearly even transmittance with increasing wavelength;

the transmittance of said wavelength distribution conversion element, within a specified wavelength region having wavelengths shorter than λ1, is less than the transmittance of said wavelength distribution conversion element in a specified wavelength region having wavelengths longer than λ2; and the transmittance of said wavelength distribution conversion element, in a specified wavelength region having wavelengths longer than λ1 and shorter than λ2, is less than the transmittance of said wavelength distribution conversion element in a specified wavelength region having wavelengths shorter than λ1; and said wavelength distribution conversion element being formed of:
a first filter having a spectral transmittance profile that,
within a specified wavelength region having wavelengths shorter than λ1, has a transmittance that is nearly unchanging with increasing wavelength, and
within a specified wavelength region having wavelengths longer than λ1, has a transmittance that is nearly unchanging with increasing wavelength but the transmittance is greater than the transmittance within the specified wavelength region having wavelengths shorter than λ1;
a second filter having a spectral transmittance profile that,
within a specified wavelength region having wavelengths shorter than λ1, has a transmittance that is nearly unchanging with increasing wavelength,
within a specified wavelength region having wavelengths longer than λ1 but shorter than λ2, has a transmittance that is nearly unchanging with increasing wavelength but the transmittance is less than the transmittance within the specified wavelength region having wavelengths shorter than λ1, and
within a specified wavelength region having wavelengths longer than λ2, has a transmittance that is nearly unchanging with increasing wavelength, but the transmittance is greater than the transmittance within the specified region having wavelengths longer than λ1 and shorter than λ2.

7. An illumination optical system comprising:
a solid-state lighting element that generates light having a spectral profile with peak intensities at multiple wavelengths such that the light output by said solid-state lighting element is perceived by an observer as being white in color; and
a wavelength distribution conversion element having a spectral transmittance profile that includes specified wavelength regions within which the transmittance is nearly constant with increasing wavelength so as to form a step of nearly even intensity, and having specified wavelength regions within which the transmittance changes with increasing wavelength so as to form a transition region;

wherein, by the combined effect of said solid-state lighting element and said wavelength distribution conversion element, the wavelength distribution of the light generated by the illumination optical system more closely resembles the wavelength distribution of daylight than the light generated by the solid-state lighting element;

said wavelength distribution conversion element satisfies the following conditions:

$480 \text{ nm} \leqq \lambda 1 \leqq 520 \text{ nm}$ $580 \text{ nm} \leqq \lambda 2 \leqq 620 \text{ nm}$ where $\lambda 1$ is a wavelength at which the spectral transmittance profile of said wavelength distribution conversion element is changing with increasing wavelength from a first step of nearly even transmittance with increasing wavelength to a second step of nearly even transmittance with increasing wavelength; and $\lambda 2$ is a wavelength, longer than wavelength $\lambda 1$, at which the spectral transmittance profile of said wavelength distribution conversion element is changing with increasing wavelength from said second step to a third step of nearly even transmittance with increasing wavelength;

said wavelength distribution conversion element has a transmittance, within a specified wavelength region having wavelengths longer than wavelength $\lambda 1$ and shorter than wavelength $\lambda 2$, that is higher than the transmittance of said wavelength distribution conversion element within a specified wavelength region having wavelengths shorter than $\lambda 1$; and said wavelength distribution conversion element has a transmittance, within a specified wavelength region having wavelengths longer than $\lambda 1$ and shorter than $\lambda 2$, that is lower than the transmittance of said wavelength distribution conversion element within a specified wavelength region having wavelengths longer than $\lambda 2$;

said wavelength distribution conversion element being formed of:

a first filter having a spectral transmittance profile that,
within a specified wavelength region having wavelengths shorter than $\lambda 1$, has a transmittance that is nearly unchanging with increasing wavelength, and
within a specified wavelength region having wavelengths longer than $\lambda 1$, has a transmittance that is nearly unchanging with increasing wavelength but the transmittance is greater than the transmittance within the specified wavelength region having wavelengths shorter than $\lambda 1$;

a second filter having a spectral transmittance profile that
within a specified wavelength region having wavelengths shorter than $\lambda 1$, has a transmittance that is nearly unchanging with increasing wavelength,
within a specified wavelength region having wavelengths longer than $\lambda 1$ but shorter than $\lambda 2$, has a transmittance that is nearly unchanging with increasing wavelength but the transmittance is less than the transmittance within the specified wavelength region having wavelengths shorter than $\lambda 1$, and
within a specified wavelength region having wavelengths longer than $\lambda 2$, has a transmittance that is nearly unchanging with increasing wavelength, but the transmittance is greater than the transmittance within the specified region having wavelengths longer than $\lambda 1$ and shorter than $\lambda 2$.

* * * * *